Aug. 28, 1934.   H. G. NORWOOD   1,971,726
EXPANSION BOLT
Filed July 5, 1933

Inventor:
Harry G. Norwood,
by Jas. L. Skidmore
Att'y.

Patented Aug. 28, 1934

1,971,726

UNITED STATES PATENT OFFICE 1,971,726

EXPANSION BOLT

Harry G. Norwood, New York, N. Y., assignor to Anna M. Percival, Long Island City, N. Y.

Application July 5, 1933, Serial No. 679,123

6 Claims. (Cl. 72—105)

This invention pertains to a new, novel and improved expansion bolt, especially designed for use in connection with stone, cement, metal, brick, concrete walls, posts and other structures to which it may be usefully, successfully and practically applied.

The prime object of the invention is to provide a simple, durable, economical, practical and thoroughly efficient expansion bolt, formed from a single piece of suitable metal adapted to be inserted within a suitable recess, opening or cavity formed in a foundation, and to be compressed into an extremely tight contact with the walls of such recess or cavity.

Another object of the invention is to so construct the improved expansion bolt from one piece of suitable metal with the headed portion at its upper or outer end that its body portion is flattened or literally distorted in opposite directions intermediate its length, so that when inserted or driven within a socket or cavity formed in any desired material the distorted portions thereof will become so intensely compressed against the wall of the socket or cavity that it will become permanently anchored therein against rotation, withdrawal or accidental removal, and thereby practically serve the purpose for which it is intended.

A further object of the invention is to provide the outer edge of the oppositely distorted portions of the bolt with a series of teeth formed in oppositely disposed staggered relation with each other, said teeth being adapted to be compressed into tight contact with the wall of the socket or cavity and bite slightly into the said wall when driven or forced within the socket, thereby constituting a safe and reliable anchoring for the bolt under any and all conditions of use thereof.

The foregoing and such other objects as may appear from the ensuing description are attained by the construction, formation, combination and arrangement of the parts hereinafter more fully described, illustrated in the accompanying drawing, and particularly pointed out in the claims appended hereto, it being understood that slight changes in the precise formation, proportions and minor details of construction may be resorted to without departing from the spirit or sacrificing any of the advantages of the invention.

In the accompanying drawing forming a part of this specification it will be seen that:

Figure 1:
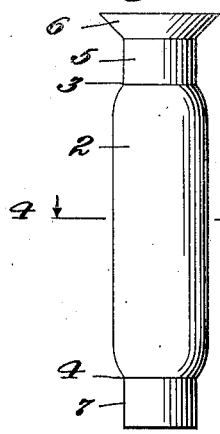
Figure 1 is an elevation of my improved expansion bolt, showing it in flattened or distorted condition intermediate its length.

In the embodiment of my invention as illustrated, by reference to Fig. 1 it will be seen that the numeral 2 designates the flattened or distorted portion of the bolt, said distorted portion extending from the top portion at 3 to its lower portion at 4, having a circular formation at 5 with a headed portion 6, and a circular formation at its lower end portion 7.

Figure 2:
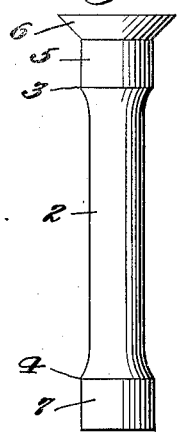
Figure 2 is an edge view of the bolt shown in Fig. 1.
Figure 3:
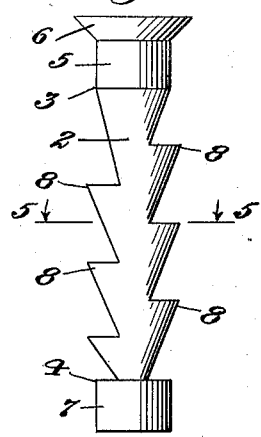
Figure 3 is an elevation of the bolt, showing its formation after the staggered teeth shall have been formed thereon.
Figure 4:
Figure 4 is a transverse section taken in the plane of the dotted lines 4—4, Fig. 1.
Figure 5:
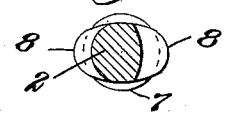
Figure 5 is a transverse section taken in the plane of the dotted lines 5—5, Fig. 3.
Figure 6:
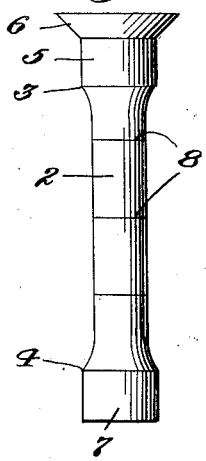
Figure 6 is an edge elevation of the bolt shown in Fig. 3.
Figure 7:
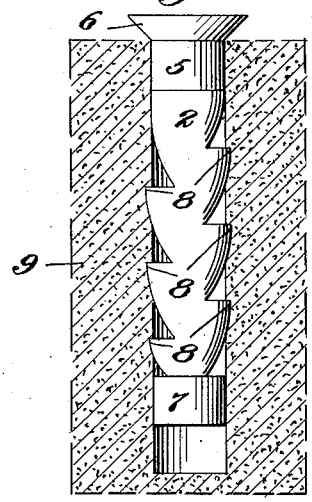
Figure 7 is an elevation of the bolt embodying my invention, showing the relation of said bolt to the wall of a socket or cavity after the bolt has been forced or driven within said socket or cavity, showing the material in which said socket is formed in cross-section.

The said bolt 2 is preferably formed from spring steel, and, if desired, it may be case hardened in order to furnish more spring outwardly, and after the bolt has been distorted by suitable dies and caused to assume the formation substantially as shown in Figs. 1 and 2, it is shifted to another die and the oppositely disposed staggered teeth 8 are cut, said teeth being clearly shown in Figs. 3 and 7 of the drawing.

It will be perceived that when the bolt is forced or driven into a socket or cavity formed in a cement, concrete block or foundation 9, the distorted toothed formation will be compressed inwardly against the wall of the said socket or cavity, and caused to assume the compressed condition, such as is shown in Fig. 7 of the drawing, thereby serving to safely lock the bolt within the socket or cavity, since after the distorted portions of the bolt shall have been compressed inwardly they have a tendency to expand outwardly in the same manner that a metal spring tends to move back and assume its original shape.

It will be readily obvious that when the bolt is intended to be used in certain lines of construction where its withdrawal may be desired or required the sharpened edges of the teeth may be slightly rounded, thus permitting its withdrawal from the socket or cavity by exerting the required force.

While the headed portion of the bolt is shown in circular formation it may be of any suitable or desirable shape.

It will be evident that by driving or forcing a bolt of the type herein described within a cavity or socket the distorted portions thereof will be caused to exert intense pressure against the wall of the cavity, and that the teeth will have an intense biting contact therewith, thereby maintaining the bolt in a securely locked position for the purpose intended in connection with the use of the ordinary well known expansion type of bolts usually employed in structural work of various kinds.

It will be understood that this particular type of expansion bolt is formed from a single piece of suitable steel or other desirable metal, and may be made of any desirable dimensions required for the use thereof, to suit any purpose for which it may be successfully employed, and may be formed by a suitable method or machines provided with such dies as may be required for its complete formation.

Having thus described my invention, what I claim and desire to secure by Letters Patent is:

1. An expansion bolt formed from a single piece of metal having a transversely distorted body portion disposed intermediate its upper and its lower end portions, a plurality of teeth formed in each side of the distorted portion, said teeth being disposed in staggered relation with each other.

2. An expansion bolt formed from a single piece of spring steel having a flattened body portion disposed intermediate its upper and its lower portions, a circular upper portion, a circular lower portion, and a series of teeth formed in each side of its flattened portion, said teeth being disposed in staggered relation with each other.

3. An expansion bolt formed from a single piece of metal distorted at each side of its vertical axis intermediate its upper and its lower end portions, a circular upper end portion, a circular lower end portion, and a series of teeth formed in each side of its distorted portions projecting beyond its circular ends, said teeth being formed in staggered relation with each other.

4. An expansion bolt formed from a single piece of spring steel having a flattened distorted portion intermediate its upper and its lower end portions at each side of its vertical center, and a series of teeth formed in each side of its distorted portions, said teeth being disposed in staggered relation with each other and projecting beyond its circular ends.

5. An expansion bolt formed from a single piece of metal having a laterally disposed distorted portion at each side of its vertical center intermediate its upper and its lower end portions, a circular lower end portion, a circular upper end portion, and a series of teeth formed in each side of the distorted portions and extended beyond said circular end portions, said teeth being formed in staggered relation with each other.

6. An expansion bolt formed from a single piece of metal transversely distorted intermediate its upper and its lower end portions, having a circular lower end, a circular upper end, and a series of teeth formed in the distorted portions only, said teeth being projected beyond said circular ends and disposed in staggered relation with each other.

HARRY G. NORWOOD.